United States Patent
Dada (10) Patent No.: US 8,235,404 B2
(45) Date of Patent: Aug. 7, 2012

(54) SUSPENSION AND STEERING SYSTEM

(75) Inventor: Winthrop Dada, Ojai, CA (US)

(73) Assignee: Found Animals Foundation, Inc., Los Angeles, CA (US)

( * ) Notice: Subject to any disclaimer, the term of this patent is extended or adjusted under 35 U.S.C. 154(b) by 149 days.

(21) Appl. No.: 12/714,197

(22) Filed: Feb. 26, 2010

(65) Prior Publication Data

US 2010/0219600 A1 Sep. 2, 2010

Related U.S. Application Data (60) Provisional application No. 61/156,226, filed on Feb. 27, 2009.

(51) Int. Cl.
*B60G 3/01* (2006.01)

(52) U.S. Cl. ............ 280/124.127; 280/335; 280/93.514

(58) Field of Classification Search ........... 280/124.127, 280/124.134, 124.135, 93.514, 93.515
See application file for complete search history.

(56) References Cited

U.S. PATENT DOCUMENTS

| | | | | |
|---|---|---|---|---|
| 2,071,577 | A * | 2/1937 | Somerville et al. | 267/230 |
| 7,591,337 | B2 * | 9/2009 | Suhre et al. | 180/210 |
| 7,722,063 | B2 * | 5/2010 | Dieziger | 280/124.103 |
| 7,784,805 | B2 * | 8/2010 | Morgan | 280/124.134 |
| 7,950,680 | B2 * | 5/2011 | Christensen | 280/124.135 |
| 8,070,172 | B1 * | 12/2011 | Smith et al. | 280/124.103 |
| 2005/0040619 | A1 * | 2/2005 | Melcher | 280/124.135 |
| 2011/0025012 | A1 * | 2/2011 | Nakamura | 280/124.135 |

FOREIGN PATENT DOCUMENTS

GB 2207645 A * 2/1989

* cited by examiner

*Primary Examiner* — Faye M. Fleming
(74) *Attorney, Agent, or Firm* — Seth D. Levy; Nixon Peabody LLP (57) ABSTRACT

The present invention discloses methods and apparatus for controlling dampening in a vehicle with no attributes of wheel scrub or camber change. The present invention further discloses steering systems, whereas the steering may function without the unwanted attributes of bump steer and roll steer.

9 Claims, 9 Drawing Sheets

SUSPENSION AND STEERING SYSTEM

RELATED APPLICATIONS

This application claims the benefit of U.S. Provisional Application Ser. No. 61/156,226, filed on Feb. 27, 2009, the entire disclosure and content of which is hereby incorporated by reference.

FIELD OF THE INVENTION

The present field of the invention relates to vehicle suspension systems and steering systems. More specifically, the present invention relates to a vehicle suspension method and device exhibiting no attributes of wheel scrub or camber change, throughout compression and rebound of the suspension system. Furthermore, the invention relates to a vehicle steering system operational with the inventive suspension system or independently, wherein the steering system functions without the unwanted attributes of bump steer and roll steer.

BACKGROUND

All publications herein are incorporated by reference to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Suspension systems for vehicles are well known and comprise a means for attachment of the wheels to the vehicle frame or body and include springs, leafs and/or dampers. The arrangement allows for substantially vertical travel of the wheels while keeping the tire in contact with the ground, thus ensuring maximum tire contact, leading to greater grip and control of the vehicle. Various methods and devices have been used to allow independent movement of each wheel in the vertical plane while retaining maximum tire contact with the road when negotiating bumps and corners. Suspension systems have also evolved to maintain better control of displacement around the vertical and horizontal axis, which might adversely affect the handling of a vehicle. A combination of struts, e.g. Macpherson, lower links, torsion bars, double wishbones, radial arms, trailing arms and beam axles are typical well known examples of such suspension systems.

The most prevalent of these well known suspension designs used in four-wheeled vehicles are the "solid beam" or "live axle" paired with transverse leaf springs. These solid beam/live axle designs are attached to longitudinally mounted leaf springs and coil springs. These crude, yet economic, suspension designs are still in use today, primarily in four-wheeled utility vehicles and trucks. Solid beam/live axle designs, regardless of how they are sprung, suffer from several major shortcomings. Amongst these shortcomings are "bump steer," high "unsprung mass" and poor packaging, as they occupy a considerable amount of space in the vehicle chassis. While solid beam/live axle designs have relatively no wheel scrub and can achieve high levels of wheel travel, they are "dependent" designs, where one side of the suspension cannot help but alter camber on the wheel/tire on the opposite side of the suspension when encountering undulations in the road/ground surface. This dependence results in "bump steer" and causes a change in the vector of the wheels/tires. This is especially problematic in live axle front suspensions when cornering. Bump steer alters the course of the vehicle in an unsafe manner. In addition, the high unsprung mass of live axles results in a rough ride and a slow-reacting suspension. The poor packaging characteristics of live axles require that large amounts of room in the chassis be allocated for suspension articulation.

The major shortcomings in solid beam/live axle suspension designs led to the advent of the "independent" suspension system. Although independent suspensions were a major improvement over solid beam/live axle suspension designs, independent suspensions also have notable shortcomings related to tire scrub, and camber and toe change all relating to the fact that the tire and wheel assembly move in an arc as they articulate.

Independent suspension designs began with swing axles and sliding pillar suspension designs and later moved on to more advanced designs including the Macpherson/Chapman struts, upper and lower A-arm suspension designs (a.k.a. short-long arm or double wishbone designs) and multi-link suspension designs. Unfortunately, all of these independent suspension designs suffer from wheel scrub and some degree of camber change throughout the wheel's articulation, as well as toe changes leading to variations in under-steer and over-steer. Because current independent designs cause a wheel to travel in an arc, the vehicle cannot have a static track-width. The lack of a static track-width causes problems with bump-steer and vehicle stability. Independent suspension designs also have limited amounts of wheel travel making them a poor choice for vehicles that require a high degree of wheel travel (e.g., off-road and military vehicles).

Early swing axle suspension designs suffered from high degrees of wheel scrub and camber change. Wheel scrub results in high levels of tire wear and negatively affects handling characteristics and camber change resulted. It may also cause unpredictable handling and severe over-steer or under-steer, depending on steering placement. Sliding pillar designs suffer from high levels of friction, thus resulting in high tire wear, increased tire heat, poor rebound performance and a relatively rough ride.

Later came the Macpherson/Chapman Strut designs which represented a seminal design change in independent suspensions, and worked relatively well and had good packaging. Wheel scrub and bump-steer remained unresolved problems with the Macpherson/Chapman strut design as did issues with camber change and limited wheel/tire travel. Upper and lower A-arm (double wishbone) suspensions feature very limited camber change when designed for short wheel/tire travel (but not in long wheel/tire travel designs) and suffer from severe wheel scrub and track change. In addition, all variants of existing suspension systems also exhibit steering geometry variations contributing to over steer and under steer.

The most recent development in suspension systems are the multi-link designs that have improved upon previous suspension systems by reducing unsprung mass and limiting camber change when designed for short travel applications. However, like other independent suspension designs, multi-link designs suffer from wheel/tire scrub, bump steer, undesirable chamber change and also have inherently low potential for large amounts of wheel travel.

All variants of existing suspension systems exhibit steering geometry variations as a result of wheel scrub/track-change. This contributes to over-steer or under-steer depending on the use of either leading or trailing steering arms. Bump-steer occurs when the wheel travels on a different arc than the steering tie-rod. When the steering is pointed straight ahead the wheel and tie-rod are on the same arc of motion. However this is no longer true when turning through a corner where the tie rod and its arc of motion have moved in or out with relation to the arc of the wheel/tire.

The increased level in performance of modern vehicles and tires has magnified the shortcomings of existing suspension systems, and in certain applications, has become the major hurdle in achieving better performance. For example, in off-road racing applications, the high degree of travel in the suspension system leads to various changes in suspension geometry, in turn leading to changes in track width, camber, castor, and toe. These variations limit the degree of certainty engineers may rely upon in developing suspension systems for better traction and performance. In the most popular Macpherson/Chapman strut applications, as the wheel and tire combination at the front of a four-wheeled vehicle rebounds, load is relieved on the particular wheel/tire and the wheel/tire geometry travels towards positive camber. The wheel also travels in an arc, increasing tire scrub and depending on the steering mechanism, leading to either over-steer or under-steer. As load is reestablished on the wheel/tire combination and the suspension system is compressed, the suspension geometry forces the wheel/tire to change from positive camber to neutral and then to negative camber. The arc of motion once again leads to large degrees of tire scrub and alters steering geometry by increasing and/or decreasing under-steer or over-steer. Accordingly, articulation of the suspension system leads to variations in the contact patch and directional vector of the tire/wheel, creating havoc for the driver trying to keep the vehicle in control.

As one can ascertain, there exist substantial advantages in establishing a vehicle's camber, tire scrub and/or toe whilst also eliminating track-change and bump-steer. There further exist advantages in providing a suspension system capable of controlling and varying camber change according to predetermined settings. Further advantages are gained by providing a method for controlling articulation of a suspension system capable of setting desired rates for camber, castor, tire scrub, and toe such that the desired rates remain consistent throughout the articulation realm of the suspension system.

The present invention describes v-arm and x-arm suspension designs and methods of use thereof that resolve existing impediments in suspension geometry. The v-arm and x-arm suspension designs may be adapted to provide various amounts of wheel travel, while offering fully independent operation, relatively low unsprung mass and compact packaging. The v-arm and x-arm suspension designs overcome the shortcomings of prior independent suspension designs by completely eliminating wheel scrub, bump steer and camber change. Also, unlike other independent designs, large amounts of wheel travel can be incorporated into the design if desired, while maintaining a very compact overall package.

SUMMARY OF THE INVENTION

The following embodiments and aspects thereof are described and illustrated in conjunction with compositions and methods which are meant to be exemplary and illustrative, not limiting in scope.

Embodiments of present invention provide an apparatus for controlling dampening in a vehicle comprising at least two v-shaped arms, each v-shaped arm comprising an upper arm and a lower arm. The inferior end of the upper arm is pivotally attached to the superior end of the lower arm by the mid-level pivot point, and forms the "v" shape. The at least two v-shaped arms are further fitted with pivot points at the superior end of the upper arm and inferior end of the lower arm. The superior pivot points of the upper arm are attached to a vehicle, thus bracing the v-arm suspension.

The inferior pivot points of the lower arm are attached to a wheel carrier. The superior pivot points, inferior pivot points, and mid-level pivot points permit for articulation of the v-arm in a substantially vertical plane, allowing the v-arm suspension to compress and rebound.

In another embodiment, the two v-shaped arms are parallel and congruent to one another, such that the v-shaped arms are of identical orientation. In another embodiment, the two v-shaped arms are parallel and reflective across the vertical axis, such that the v-shaped arms are of mirrored orientation.

In another embodiment, the present invention teaches a suspension apparatus comprising at least one v-shaped arm comprising an upper arm and a lower arm, and at least one x-shaped arm comprising an upper arm and a lower arm. In the at least one v-arm, the inferior end of the upper arm is pivotally attached to the superior end of the lower arm by the mid-level pivot point, and forms the "v" shape. In the at least one x-arm, the upper arm is pivotally attached to the lower arm at or above the midline of the lower arm and at or below the midline of the upper arm. The at least one v-shaped arm and at least one x-shaped arm are further fitted with pivot points at the superior end of the upper arm and inferior end of the lower arm. The superior pivot points of the upper arm are attached to a vehicle, bracing the x-arm and v-arm suspension. The inferior pivot points of the lower arm are attached to a wheel carrier. The superior pivot points, inferior pivot points, and mid-level pivot points permit for articulation of the v-arm and v-arm in a substantially vertical plane.

In another embodiment, the v-shaped arm is parallel and congruent to the x-shaped arm, such that the v-shaped arm and x-shaped arm are of identical orientation. In another embodiment, the v-shaped arm is parallel and reflective across the vertical axis to the x-shaped arm.

In yet another embodiment, the present invention teaches a suspension apparatus comprising at least two x-shaped arms comprising an upper arm and a lower arm. The upper arm is pivotally attached to the lower arm at or above the midline of the lower arm and at or below the midline of the upper arm. The at least two x-shaped arms are further fitted with pivot points at the superior end of the upper arm and inferior end of the lower arm. The superior pivot points of the upper arm are attached to a vehicle, bracing the X-arm suspension. The inferior pivot points of the lower arm are attached to a wheel carrier. The superior pivot points, inferior pivot points, and mid-level pivot points permit for articulation of the X-arm suspension in a substantially vertical plane.

In another embodiment, the two x-shaped arms are parallel and congruent to one another, such that the x-shaped arms are of identical orientation. In another embodiment, the two x-shaped arms are parallel and reflective across the vertical axis to one another, such that the x-shaped arms are of mirrored orientation.

In another embodiment of the invention, the x-arm and/or v-arm suspension apparatus may be fitted with at least one cross-brace for improved structural rigidity and support. The cross-brace may be fitted across or to the upper arm and lower arm, x-shaped arms, v-shaped arms, and combinations thereof.

In one embodiment of the invention, the suspension apparatus may be fitted with at least one dampening device. For instance in the x-arm suspension, the dampening device may be removably affixed across or to the superior end of the lower arm and superior pivot point, inferior end of the upper arm and inferior pivot point, and/or superior end of the lower arm and inferior end of the upper arm. In another embodiment the dampening device may be removably affixed across or to the inferior pivot point and superior pivot point of the x-arm suspension. Dampeners may include, but are in no way limited to, a shock, spring, leaf spring, coil, cantilever spring assembly, cantilever shock assembly, torsion bar and combinations thereof.

In a further embodiment, the at least one dampening device may be mounted to the wheel carrier at the inferior end, and the vehicle at the superior end.

In an embodiment of the invention, the suspension apparatus comprises an adjustable vertical limiter affixed to the wheel carrier and traversing through the vehicle, whereas the limiter may be adjusted to regulate suspension travel. The limiter may find further utility in providing structural support to the suspension apparatus. In various embodiments, the limiter may be telescopic, encompassing the limiter within the suspension apparatus. In yet another embodiment, the limiter may be integrated or incorporate a dampening device.

In another embodiment, the present invention teaches an x-arm and/or a v-arm suspension, wherein the upper arm and lower arm are of equal length. In yet another embodiment, the present invention teaches an x-arm and/or a v-arm suspension wherein the upper arm and lower arm are of unequal length.

In yet another embodiment, the present invention teaches a v-arm and/or an x-arm suspension apparatus configured in a plane perpendicular to the longitudinal axis of the vehicle. In an additional embodiment, the present invention teaches a v-arm and/or a x-arm suspension apparatus configured in a plane parallel with the longitudinal axis of the vehicle. In additional embodiments, the present invention teaches a v-arm and/or a x-arm suspension apparatus configured such that the v-arm and x-arm assemblies are perpendicular with respect to each other and either the v-arm or x-arm assembly is in a plane parallel with the longitudinal axis of the vehicle.

In yet another embodiment, the v-arm and/or x-arm suspension system may be mounted to the vehicle at various vertical and/or horizontal angles to create the desired suspension articulation trajectory.

The present invention is further directed at a steering mechanism comprising a steering rack affixed to a vehicle, whereas distal ends of the steering rack comprise rack pinion gears matted to pinion gears found at the proximal ends of at least two torque tubes. The complementing pinion gears of the rack and at least two torque tubes, when enacted, rotate the torque tube. The distal ends of the torque tubes comprise forty-five degree angled pinions mated to forty-five degree angled pinions found atop a steering damper. The steering damper extends longitudinally to the spindle and attaches to the spindle via pinions to articulate the spindle, thus steering the wheel.

In yet another embodiment, the present invention teaches a steering mechanism comprising a steering rack affixed to a vehicle, where at least a portion of the rack is capable of pivotal rotation. A torque tube is attached to each distal end of the steering rack, with the opposing end of the torque tube pivotally attached to a tie rod. The torque tube comprises a telescopic element for compliant compressions and expansion of the torque tube. The tie rod is slideably attached to a wheel carrier, allowing the tie rod to steer the wheel.

In yet another embodiment, the inventive steering system may utilize worm gears, captive rollers, ball bearings, lever arms, or other gear arrangement known in the art for operating the steering system. In another embodiment of the invention, the steering system's operational connectivity of the steering rack, torque tube, tie rod, steering damper and spindle may incorporate the use of angled pinion gears, u-joints, or other mechanisms known in the art for functional operation of the steering system.

In another embodiment, the inventive steering system may utilize a slip yoke, springs, leaf springs, pressure damper, or other dampening devices known in the art for steering dampening by the steering damper.

Other features and advantages of the invention will become apparent from the following detailed description, taken in conjunction with the accompanying drawings, which illustrate, by way of example, various features of embodiments of the invention.

BRIEF DESCRIPTION OF THE FIGURES

Exemplary embodiments are illustrated in referenced figures. It is intended that the embodiments and figures disclosed herein are to be considered illustrative rather than restrictive.

DESCRIPTION OF THE INVENTION

All references cited herein are incorporated by reference in their entirety as though fully set forth. Unless defined otherwise, technical terms used herein have the same meaning as commonly understood by one of ordinary skill in the art to which this invention belongs. *Competition Car Suspension: A practical handbook*, Staniforth, Allan (2006); *Chassis Engineering HP 1055*, Adams, Herb (1993); and *Chassis and Suspension Handbook*, Munroe, Carl (2003) provide one skilled in the art with a general guide to many of the terms used in the present application.

One skilled in the art will recognize many methods and materials similar or equivalent to those described herein, which could be used in the practice of the present invention. Indeed, the present invention is in no way limited to the methods and materials described. For purposes of the present invention, the following terms are defined below.

"Bump Steer" as used herein refers to the tendency of corresponding wheels to steer (inwards or outwards) as the wheels move upwards and downwards during suspension travel.

"Camber" as used herein refers to the angle made by the wheel of an automobile; specifically, it is the angle between the vertical axis of the wheel and the vertical axis of the vehicle when viewed from the front or rear. Camber is used in the design of steering and suspension. If the top of the wheel is farther out than the bottom (that is, away from the axle), it is called positive camber; if the bottom of the wheel is farther out than the top, it is called negative camber.

"Compression" as used herein refers to the constriction of the vehicle suspension system, for example when hitting a bump.

"Contact Patch" as used herein refers to the portion of a vehicle's tire that is in actual contact with the road surface.

"Rebound" as used herein refers to the expansion of the vehicle suspension system, for example when 'rebounding' from hitting a bump.

"Roll Steer" as used herein refers to the tendency of a wheel to steer (inwards or outwards) as the wheel moves upwards and downwards during suspension travel.

"Steering Axis Inclination" (SAI) as used herein involves the steering axis which is the line between the top pivot point of the hub and the lower ball joint of the hub. On a Macpherson strut, the top pivot point is the strut bearing, and the bottom point is the lower ball joint. On a suspension using upper and lower control arms, the pivot points are where the upright connects to the control arms. The inclination of the steering axis is measured as the angle between the steering axis and the centerline of the wheel (so if your camber is adjustable within the pivot points you can change the SAD.

"Tire Scrub" as used herein refers to the tire scrub radius which is the distance on the ground between the centerline of the tire contact patch and the point at which the SAI intersects the ground. If these two lines intersect at ground level, then you are said to have zero scrub. If the SAI intersects the ground at a point inside or outside of the centerline of the contact patch, you are said to have positive or negative scrub, respectively.

"Toe" as used herein refers to the symmetric angle that each wheel makes with the longitudinal axis of the vehicle, as a function of static geometry, and kinematic and compliant effects. For example, if the leading edge of a tire points towards the longitudinal axis of the vehicle, the tire is said to have 'toe-in,' whereas if the tire points away from the longitudinal axis of the vehicle, the tire is said to have 'toe-out.' The amount of toe can be expressed in degrees as the angle to which the tire deviates from parallel, or more commonly, as the difference between the track width as measured in inches or centimeters. Toe settings affect three major areas of vehicle performance: tire wear, straight-line stability and corner entry handling characteristics.

The present invention discloses a suspension apparatus ("suspension system") and method of use thereof that eliminates tire scrub and variations in camber, throughout the suspension systems' articulation. The present invention further teaches a suspension apparatus capable of eliminating toe changes throughout the suspension systems' articulation. The present invention further discloses a steering mechanism which cooperates with the inventive suspension systems to elimination tire scrub, variations in camber, and incidents of bump steer and/or roll steer, as the suspension system articulates. Application of the present invention may be utilized on all vehicles requiring a dampening method, including but not limited to, automobiles, motorcycles, trucks, office chairs, bicycles, bicycle seats, pogo sticks, and other apparatuses known in the art.

In one embodiment, the present invention teaches a suspension apparatus comprising at least two v-shaped arms, each v-shaped arm comprising an upper arm and a lower arm. The inferior end of the upper arm is pivotally attached to the superior end of the lower arm by the mid-level pivot point, and forms the at least two "v" shaped arms. The at least two v-shaped arms are further fitted with pivot points at the superior end of the upper arm and inferior end of the lower arm. The superior pivot points of the upper arm are attached to a vehicle, thus bracing the v-arm suspension. The inferior pivot points of the lower arm are attached to a wheel carrier. The wheel carrier is in communication with the vehicle wheel/tire assembly, which travels in a substantially vertical position to the road surface. The superior pivot points, inferior pivot points, and mid-level pivot points permit for articulation of the v-arm in a substantially vertical plane, allowing the v-arm suspension to compress and rebound.

In another embodiment, the two v-shaped arms are parallel and congruent to one another, such that the v-shaped arms are of identical orientation. In another embodiment, the two v-shaped arms are parallel and reflective across the vertical axis, such that the v-shaped arms are of mirrored orientation.

In another embodiment, the present invention teaches a suspension system comprising at least one v-shaped arm comprising an upper arm and a lower arm, and at least one x-shaped arm comprising an upper arm and a lower arm. In the at least one v-shaped arm, the inferior end of the upper arm is pivotally attached to the superior end of the lower arm by the mid-level pivot point, and forms the "v" shape. In the at least one x-shaped arm, the upper arm is pivotally attached to the lower arm at or above the midline of the lower arm and at or below the midline of the upper arm. The at least one v-shaped arm and at least one x-shaped arm are further fitted with pivot points at the superior end of the upper arms and inferior end of the lower arms. The superior pivot points of the upper arms are attached to a vehicle, bracing the x-shaped arm and v-shaped arm suspension. The inferior pivot points of the lower arms are attached to a wheel carrier. The wheel carrier is in communication with the vehicle hub and wheel/tire assembly, and travels in a substantially vertical position to the road surface. The superior pivot points, inferior pivot points, and mid-level pivot points permit for articulation of the x-shaped arm and v-shaped arm in a substantially vertical plane, allowing the suspension system to compress and rebound.

In another embodiment, the v-shaped arm is parallel and congruent to the x-shaped arm, such that the v-shaped arm and x-shaped arm are of identical orientation. In another embodiment, the v-shaped arm is parallel and reflective across the vertical axis to the x-shaped arm.

In yet another embodiment, the present invention teaches a suspension system comprising at least two x-shaped arms, each x-shaped arm comprising an upper arm and a lower arm. The upper arm is pivotally attached to the lower arm at or above the midline of the lower arm and at or below the midline of the upper arm. The at least two x-shaped arms are further fitted with pivot points at the superior end of the upper arms and inferior end of the lower arms. The superior pivot points of the upper arms are attached to a vehicle, bracing the suspension system. The inferior pivot points of the lower arms are attached to a wheel carrier. The wheel carrier is in communication with the wheel/tire assembly, and travels in a substantially vertical position to the road surface. The superior pivot points, inferior pivot points, and mid-level pivot points permit for articulation of the x-shaped arm suspension in a substantially vertical plane, allowing the suspension system to compress and rebound.

In another embodiment, the two x-shaped arms are parallel and congruent to one another, such that the x-shaped arms are of identical orientation. In another embodiment, the two x-shaped arms are parallel and reflective across the vertical axis, such that the x-shaped arms are of mirrored orientation.

In another embodiment of the invention, the x-shaped arm and/or v-shaped arm suspension may be fitted with at least one cross-brace for improved structural rigidity and support. The cross-brace may be fitted across or to the upper arms and lower arms, x-shaped arms, v-shaped arms, and combinations thereof.

In one embodiment of the invention, the x-shaped arm may be fitted with a dampening device for controlling the suspension system. The dampening device may be removably affixed across or to the superior end of the lower arm and superior pivot point, inferior end of the upper arm and inferior pivot point, and/or superior end of the lower arm and inferior end of the upper arm. In another embodiment the dampening device may be removably affixed across or to the inferior pivot point and superior pivot point of the x-arm suspension. Dampeners may include, but are in no way limited to, a shock, spring, leaf spring, coil, cantilever spring assembly, cantilever shock assembly, torsion bar and combinations thereof.

In another embodiment, the present invention teaches an x-shaped arm and/or a v-shaped arm suspension system, wherein the upper arm and lower arm are of equal length. In yet another embodiment, the present invention teaches an x-shaped arm and/or a v-shaped arm suspension system wherein the upper arm and lower arm are of unequal length.

In yet another embodiment, the present invention teaches a v-shaped arm and/or an x-shaped arm assembly configured in a plane substantially perpendicular to the longitudinal axis of the vehicle. In an additional embodiment, the present invention teaches a v-shaped arm and/or an x-shaped arm assembly configured in a plane substantially parallel with the longitudinal axis of the vehicle. In additional embodiments, the present invention teaches a v-arm and/or an x-arm assembly configured such that the v/v-shaped arm, x/x-shaped arm or v/x-shaped arm assemblies are substantially perpendicular with respect to each other.

In another embodiment of the present invention, a steering mechanism is taught comprising a steering rack affixed to a vehicle, whereas distal ends of the steering rack comprise of rack pinion gears matted to pinion gears found at the proximal ends of at least two torque tubes. The complementing pinion gears of the rack and at least two torque tubes, when enacted, rotate the torque tube. The distal ends of the torque tubes comprise forty-five degree angled pinions mated to forty-five degree angled pinions found atop a steering damper. The steering damper extends longitudinally to the spindle and attaches to the spindle via pinions to articulate the spindle, thus steering the wheel. In operation, the embodied steering mechanism eliminates incidents of bump steer and/or roll steer by proportional compression and rebound of the steering damper as the suspension travels. As the spindle, torque tube and rack remain constant in the horizontal plane, with respect to vertical travel in the suspension system, the spindle, torque tube and rack are not subject to steering axis inclination ("SAI"). The advent of the steering damper and configuration of the steering components allows for the invention steering system to steer a wheel without incidence of bump steer and/or roll steer.

In yet another embodiment, the present invention teaches a steering mechanism comprising a steering rack affixed to a vehicle, where at least a portion of the rack is capable of pivotal rotation. A torque tube is attached to each distal end of the steering rack, with the opposing end of the torque tube pivotally attached to a tie rod. The torque tube comprises a telescopic element for compliant compressions and expansion of the torque tube. The tie rod is slideably attached to a wheel carrier, allowing the tie rod to steer the wheel. In operation, the steering rack is initiated, invoking the torque tube, connected to the tie rod, to move towards or away from the wheel, thus turning the wheel. As the suspension system travels in a substantially vertical plane with respect to the vehicle, the tie rod travels in conjunction with the suspension system. As the tie rod is pivotally attached to the torque tube, vertical movement in the tie rod is absorbed by the telescopic element in the torque tube, eliminating any bump steer or roll steer.

In yet another embodiment, the invention steering system may utilize worm gears, captive rollers, ball bearings, lever arms, or other gear arrangement known in the art for operating the steering system. In another embodiment of the invention steering system, operational connectivity of the steering rack, torque tube, tie rod, steering damper and spindle may incorporate the use of angled pinion gears, u-joints, or other mechanisms known in the art for functional operation of the steering system.

In another embodiment, the present invention steering mechanism may utilize a slip yoke, springs, leaf springs, pressure damper, or other dampening devices known in the art for steering dampening by the steering damper.

Figure 1:
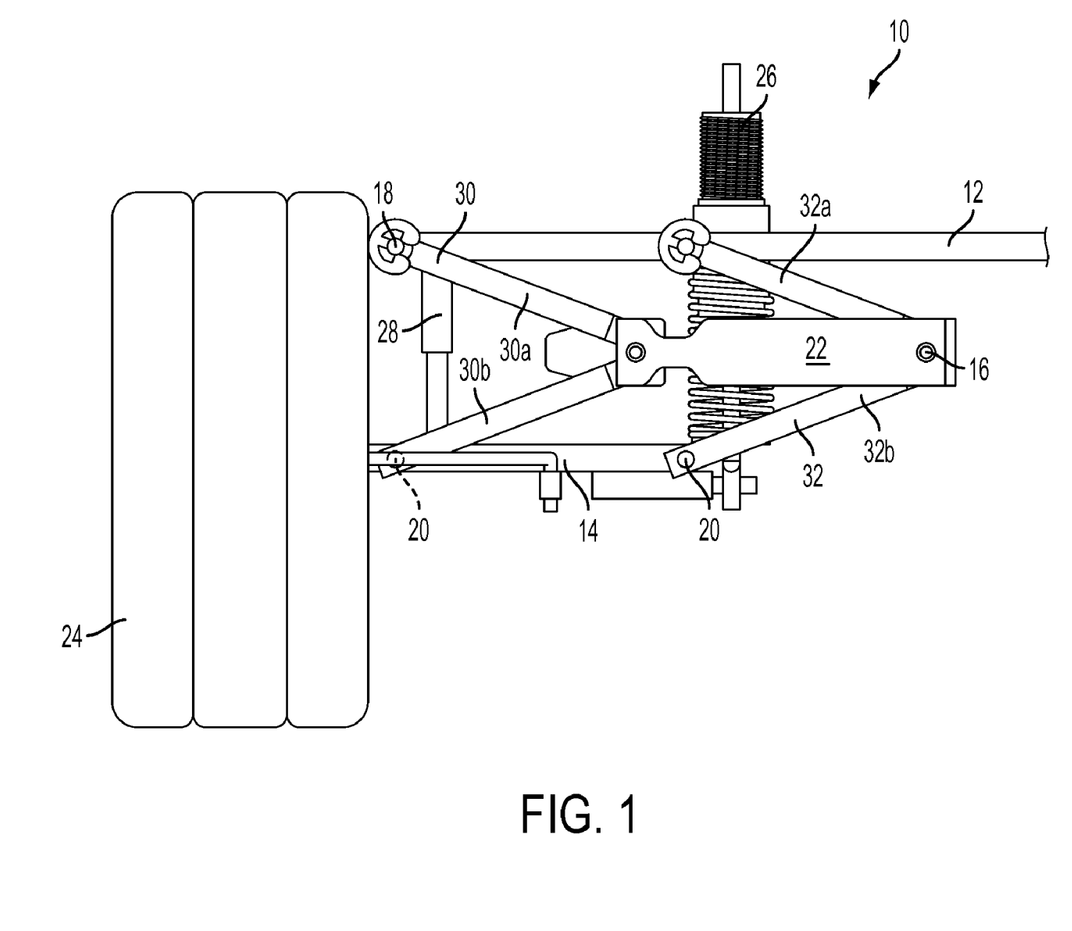
FIG. 1 depicts a front perspective view of a partially compressed v/v-shaped arm suspension system in accordance with an embodiment of the present invention.
Figure 2:
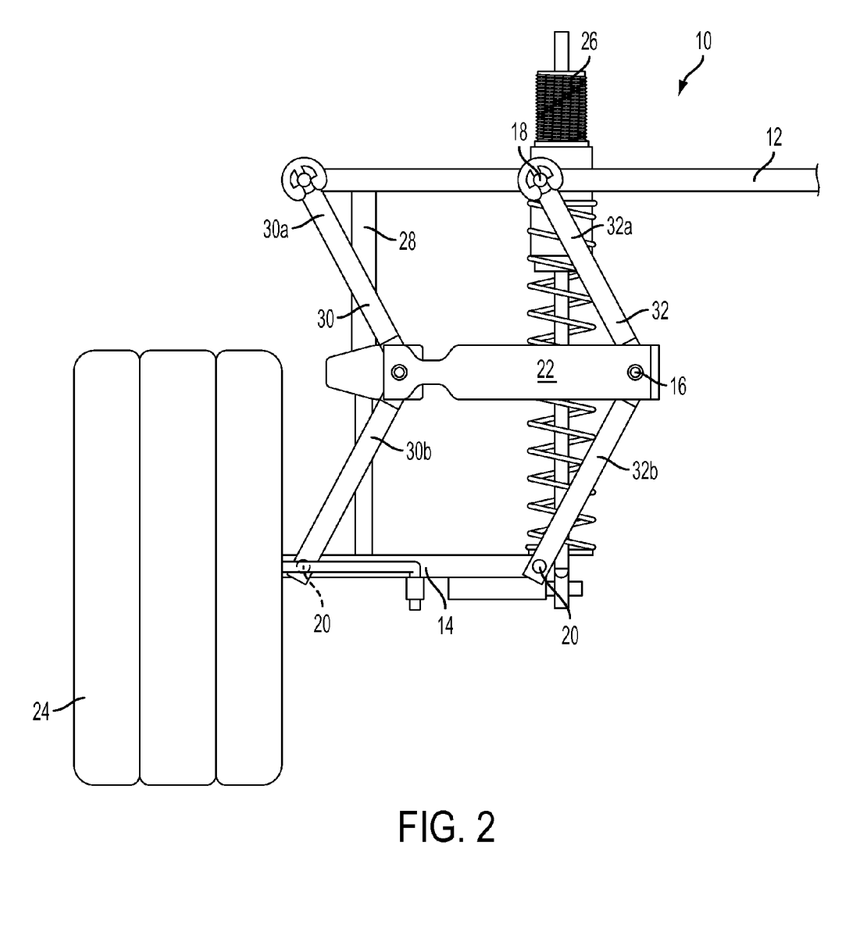
FIG. 2 depicts a front perspective view of a partially rebounded v/v-shaped arm suspension system in accordance with an embodiment of the present invention.

FIGS. 1 and 2 provide various perspectives of a v/v-shaped arm suspension system. FIG. 1 depicts a front perspective view of a partially compressed v/v-shaped arm suspension system in accordance with an embodiment of the present invention. FIG. 2 depicts a front perspective view of a partially rebounded v/v-shaped arm suspension system in accordance with an embodiment of the present invention.

The suspension system 10, depicted in FIGS. 1 and 2, comprise a first v-shaped arm 30 and a second v-shaped arm 32, each v-shaped arm 30 and 32 comprising an upper arm 30*a* and 32*a* (respectively) and a lower arm 30*b* and 32*b* (respectively), pivotally attached to one another by the mid-level pivot point 16. The upper arms 30*a* and 32*a* are further pivotally attached to the vehicle 12 by the upper pivot points 18. The lower arms 30*b* and 32*b* are pivotally attached to the wheel carrier 14 by lower pivot points 20. The wheel carrier 14 supports the corresponding wheel/tire assembly 24. The upper arms 30*a* and 32*b* and lower arms 30*b* and 32*b*, in conjunction with the lower pivot points 20, mid-level pivot points 16 and upper pivot points 18, provide the articulation necessary to move the wheel carrier 14 and respective wheel/tire assembly 24 in a substantially vertical plane. The two v-shaped arms 30 and 32 are in pivotal communication with one another through the cross link 22. The mid-level pivot points 16 of the v-shaped arms 30 and 32 provide stability for pivotal communication between the first v-shaped arm 30 and second v-shaped arm 32. FIG. 1 further depicts a dampening device 26 which may be utilized in the subject suspension system 10. In addition, FIGS. 1 and 2 depict an adjustable vertical limiter 28 for regulating suspension travel. The adjustable vertical limiter 28 is affixed to the wheel carrier 14 at the inferior end, and the vehicle 12 at the superior end. The limiter 28 may be adjusted to regulate suspension travel. The limiter 28 may find further utility in providing structural support to the suspension system 10. In this exemplary embodiment, the limiter 28 is telescopic, however other embodiments may incorporate various retraction and expansion mechanisms know in the art. In yet another embodiment, the limiter 28 may be integrated or incorporate into the dampening device 26.

Figure 3:
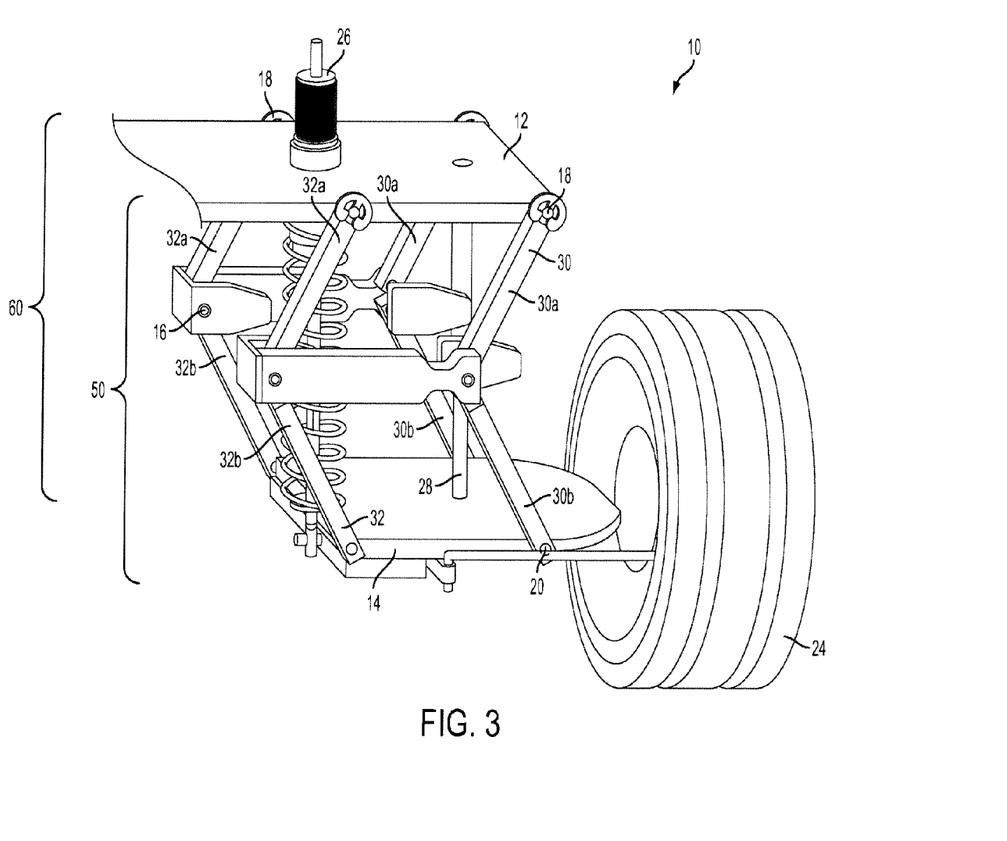
FIG. 3 depicts a front quarter perspective view of a v/v-shaped arm suspension system in accordance with an embodiment of the present invention.
Figure 4:
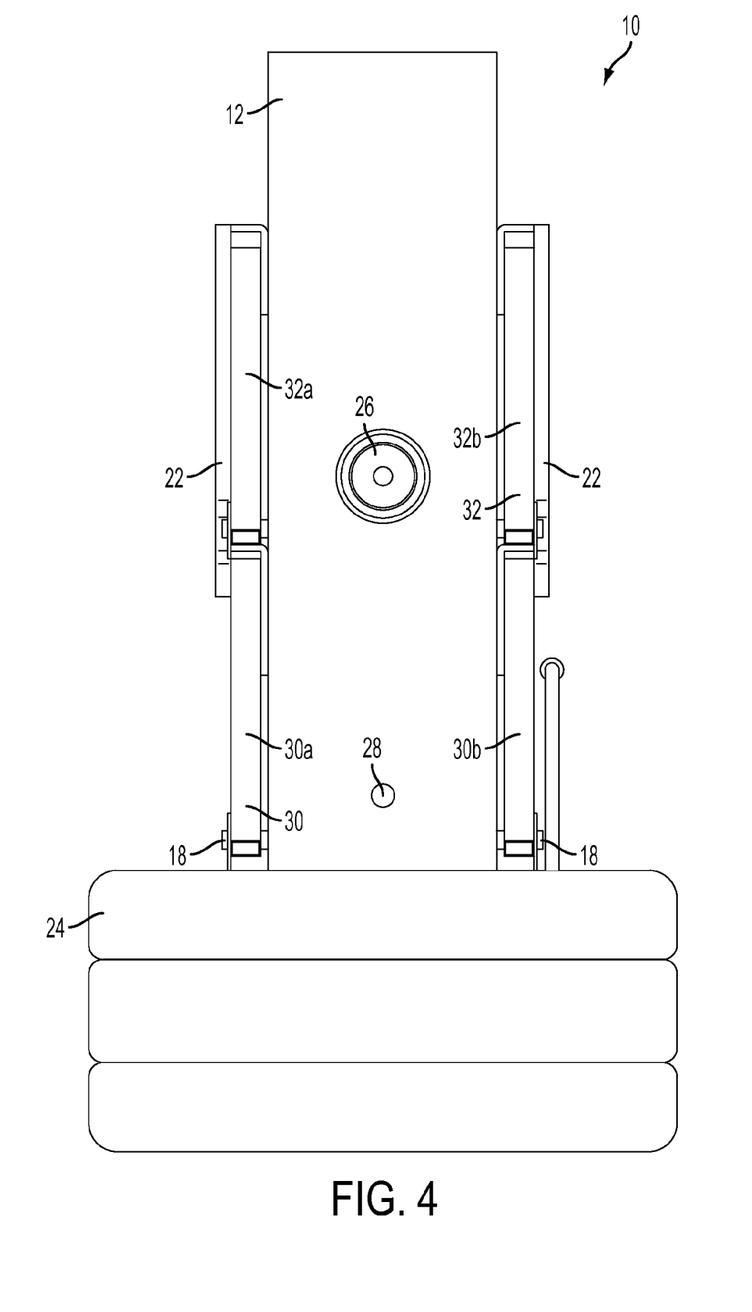
FIG. 4 depicts a top perspective view of a v/v-shaped arm suspension system in accordance with an embodiment of the present invention.

FIGS. 3 and 4 depict various perspectives of a dual v/v-shaped arm suspension system. FIG. 3 depicts and front quarter perspective view of the dual v/v-shaped arm suspension system in accordance with an embodiment of the present invention. FIG. 4 depicts a top perspective view of a dual v/v-shaped arm suspension system in accordance with an embodiment of the present invention. The suspension system 10 of FIGS. 3 and 4, comprise a fore v-shaped arm assembly 50 and an aft v-shaped arm assembly 60. Each v/v-shaped arm assembly 50 and 60 comprises a first v-shaped arm 30 and a second v-shaped arm 32. Wherein each v-shaped arm comprises an upper arm 30a and 32a, and a lower arm 30a and 32b, pivotally attached to one another by the mid-level pivot points 16. The upper arms 30a and 32a are further pivotally attached to the vehicle 12 by upper pivot points 18. The lower arms 32a and 32b are pivotally attached to the wheel carrier 14 by lower pivot points 20. The wheel carrier 14 supports the corresponding wheel/tire assembly 24. The upper arms 30a and 32a and lower arms 30b and 32b are, in conjunction with the lower pivot points 20, mid-level pivot points 16 and upper pivot points 18, are configured to provide the articulation necessary to move the wheel carrier 14 and respective wheel/tire assembly 24 in a substantially vertical plane. The two v-shaped arms of each v/v-shaped arm assembly are in pivotal communication with one another through the cross link 22. The mid-level pivot points 16 of the fore v-shaped arm assembly 50 and aft v-shaped arm assembly 60 provide for pivotal communication between each of the v/v-shaped arms. FIGS. 3 and 4 further depict a dampening device 26 which may be utilized in the subject suspension system 10. In addition, FIGS. 3 and 4 depict an adjustable vertical limiter 28 for regulating suspension travel.

The exemplary embodiment of the suspension system 10 provided in FIG. 4 depicts the fore v-shaped arm assembly 50 and aft v-shaped arm assembly 60 configured to be parallel and congruent to one another, such that the v-shaped arms 30 and 32 are of identical orientation. In another embodiment the fore v-shaped arm assembly 50 and aft v-shaped arm assembly 60 are configured such that the v/v-shaped arm assemblies are parallel and reflective at the vertical axis, such that the two v-shaped arms are of mirrored orientation. In yet another embodiment the fore v-shaped arm assembly 50 and aft v-shaped arm assembly 60 are configured such that the v/v-shaped arm assemblies are staggered and reflective at the vertical axis, so that the v-shaped arms may overlap in the horizontal axis. In an additional embodiment the fore v-shaped arm assembly 50 and aft v-shaped arm assembly 60 are configured such that the v/v-shaped arm assemblies are staggered and congruent at the vertical axis.

Figure 5:
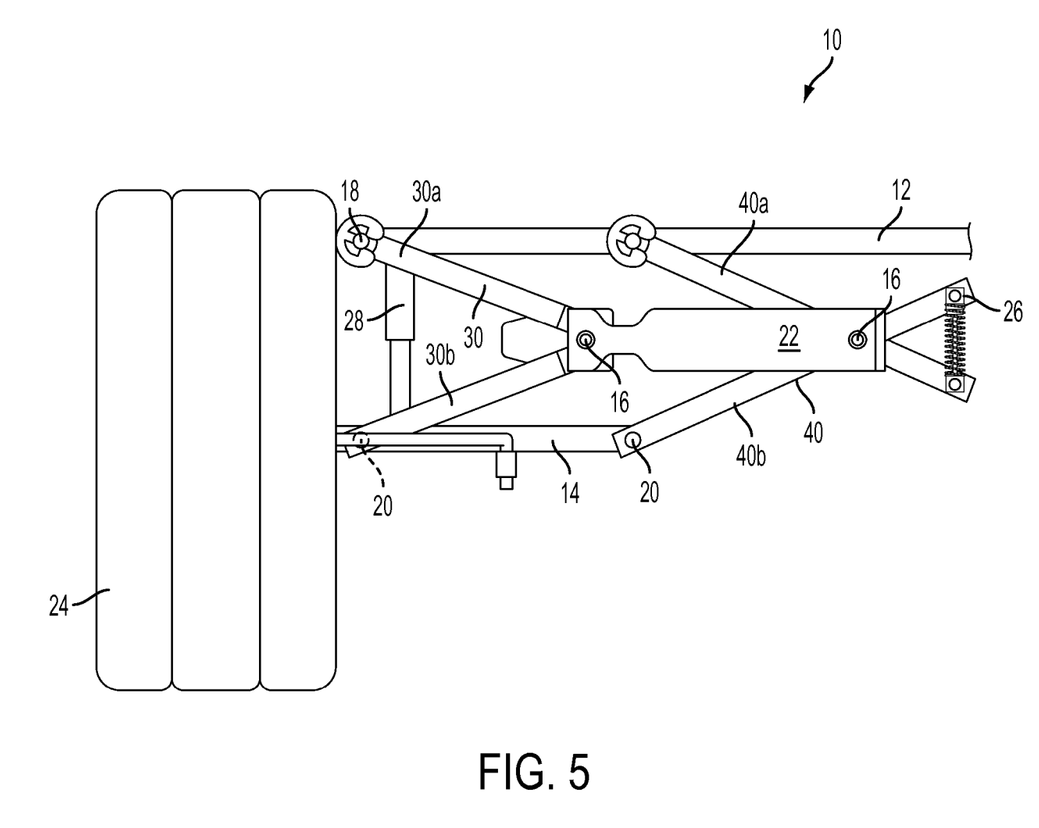
FIG. 5 depicts a front perspective view of a partially compressed v/x-shaped arm suspension system in accordance with an embodiment of the present invention.
Figure 6:
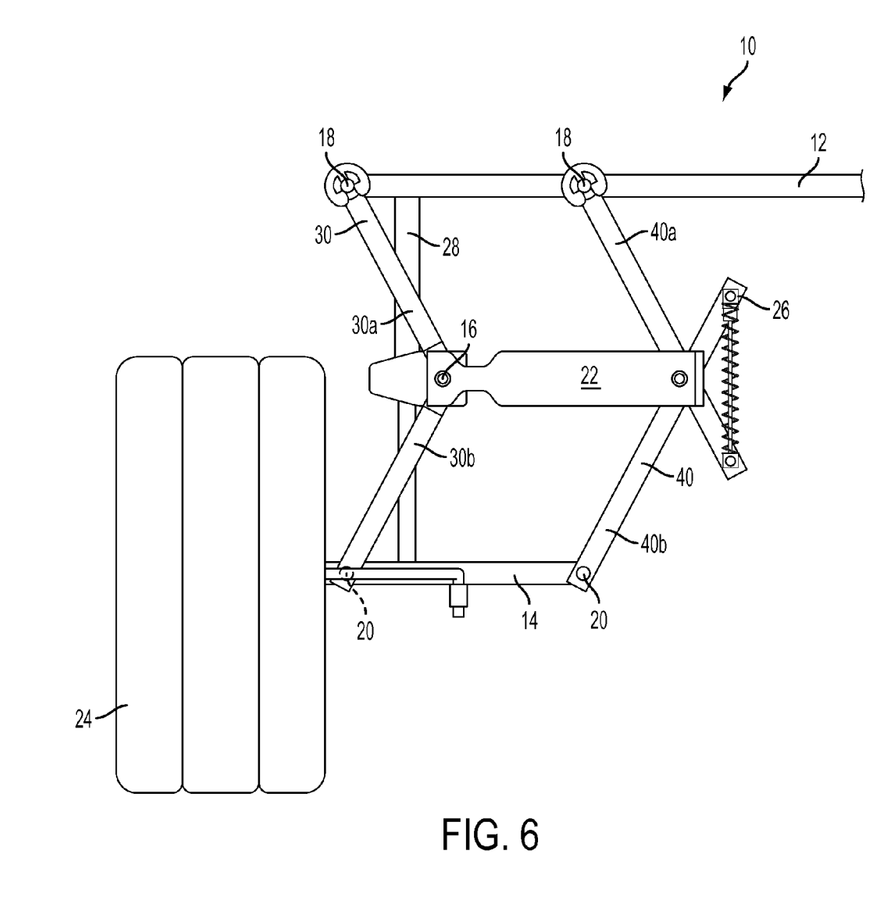
FIG. 6 depicts a front perspective view of a partially rebounded v/x-shaped arm suspension system in accordance with an embodiment of the present invention.

FIGS. 5 and 6 provide various perspectives of a v/x-shaped arm suspension system. FIG. 5 depicts a front perspective view of a partially compressed v/x-shaped arm suspension system in accordance with an embodiment of the present invention. FIG. 6 depicts a front perspective view of a partially rebounded v/x-shaped arm suspension system in accordance with an embodiment of the present invention.

The suspension system 10, depicted in FIGS. 5 and 6, comprise a v-shaped arm 30 and an x-shaped arm 32. The v-shaped arm 30 comprises an upper arm 30a and lower arm 30b, pivotally attached to one another by the mid-level pivot point 16. The upper arm 30a is further pivotally attached to a vehicle 12 by an upper pivot point 18. The lower arm 30b is pivotally attached to a wheel carrier 14 by a lower pivot point 20. The wheel carrier 14 supports a corresponding wheel/tire assembly 24. The x-shaped arm 40 comprises an upper arm 40a and lower arm 40b. The upper arm 40a is pivotally attached to the lower arm 40b at or above a midline of the lower arm 40b and at or below a midline of the upper arm 40a, by the mid-level pivot point 16. The superior end of the upper arm 40a is further pivotally attached to the vehicle 12 by an upper pivot point 18. The inferior end of the lower arm 40b is pivotally attached to the wheel carrier 14 by a lower pivot point 20. The upper arm 40a and lower arm 40b, in conjunction with the lower pivot point 20, mid-level pivot point 16 and upper pivot point 18, provide the articulation necessary to move the wheel carrier 14 and respective wheel/tire assembly 24 in a substantially vertical plane. The v-shaped arm 30 and x-shaped arm 40 are in pivotal communication with one another through a cross link 22, attached at the mid-level points 16 of the v-shaped arms 30 and x-shaped arm 40 assemblies. The cross link 22 provide stability for pivotal communication between the v-shaped arm 30 and x-shaped arm 40 assemblies.

FIGS. 5 and 6 further depict a dampening device 26 which may be utilized in the subject suspension system 10. One end of the dampening device 26 is attached to the superior end of the lower x-shaped arm 40b, with the opposite end of the dampening device attached to the inferior end of the upper x-shaped arm 40a. Articulation of the v/x-shaped arm assembly and corresponding dampening device 26 may be seen in FIGS. 5 and 6.

In addition, FIGS. 5 and 6 depict an adjustable vertical limiter 28 for regulating suspension travel. The adjustable vertical limiter 28 is affixed to the wheel carrier 14 at the one end, and the vehicle 12 at the other end. The limiter 28 may be adjusted to regulate suspension travel. The limiter 28 may find further utility in providing structural support to the suspension system 10. In this exemplary embodiment, the limiter 28 is telescopic, however other embodiments may incorporate various retraction and expansion mechanisms know in the art. In yet another embodiment, the limiter 28 may be integrated into, or incorporate, the dampening device 26.

Figure 7:
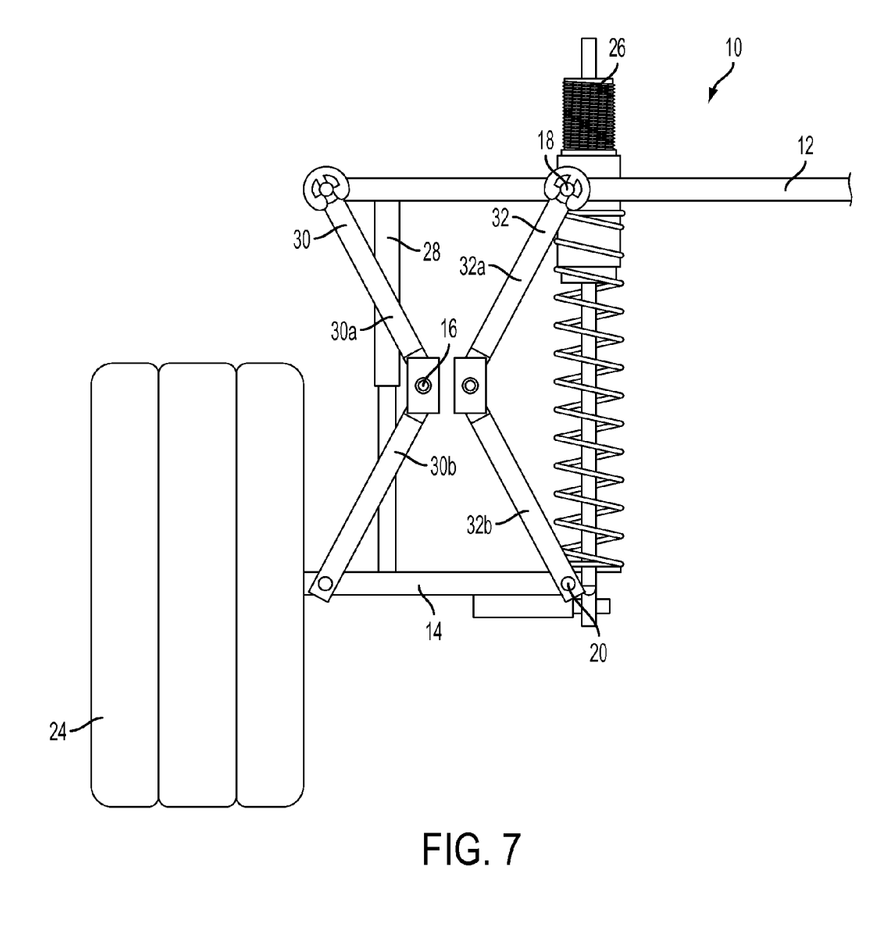
FIG. 7 depicts a front perspective view of a partially rebounded v/v-shaped arm suspension system in accordance with an embodiment of the present invention.
Figure 8:
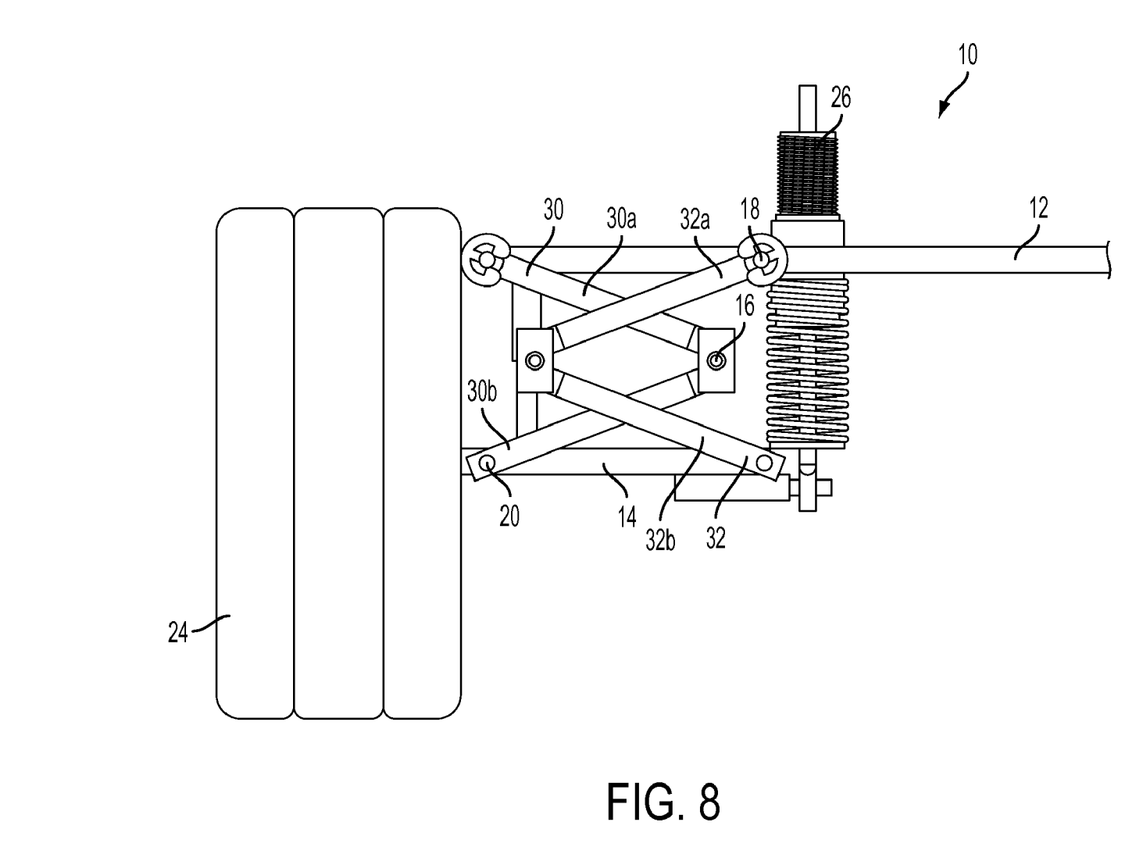
FIG. 8 depicts a front perspective view of a partially compressed v/v-shaped arm suspension system in accordance with an embodiment of the present invention.

FIGS. 7 and 8 provide various perspectives of a v/v-shaped arm suspension system. FIG. 7 depicts a front perspective view of a partially rebounded v/v-shaped arm suspension system in accordance with an embodiment of the present invention. FIG. 8 depicts a front perspective view of a partially compressed v/v-shaped arm suspension system in accordance with an embodiment of the present invention.

The suspension system 10, depicted in FIGS. 7 and 8, comprise a first v-shaped arm 30 and a second v-shaped arm 32. Both v-shaped arms 30 and 32 comprising an upper arm 30a and 32a (respectively) and lower arm 30b and 32b (respectively). The first v-shaped arm 30 is congruent to the second v-shaped arm 32. In addition, the first v-shaped arm 30 is reflective to the second v-shaped arm 32 at the vertical axis and staggered to the second v-shaped arm 32 in the horizontal axis, such that the two v-shaped arms are staggered mirror images of one another in the vertical axis. The upper arms 30a and 32a are pivotally attached to a vehicle 12 by upper pivot points 18. The lower arms 30b and 32b are pivotally attached to a wheel carrier 14 by lower pivot points 20. The wheel carrier 14 supports a corresponding wheel/tire assembly 24. The upper arms 30a and 32b, and lower arms 30b and 32b, in conjunction with the lower pivot points 20, mid-level pivot points 16 and upper pivot points 18, provide the articulation necessary to move the wheel carrier 14 and respective wheel/tire assembly 24 in a substantially vertical plane. FIGS. 7 and 8 further depict a dampening device 26 affixed to the suspension system 10. In addition, FIGS. 7 and 8 depict an adjustable vertical limiter 28 for regulating suspension travel. The adjustable vertical limiter 28 is affixed to the wheel carrier 14 at one end, and the vehicle 12 at the other end. The limiter 28 may be adjusted to regulate suspension travel. The limiter 28 may find further utility in providing structural support to the suspension system 10. In this exemplary embodiment, the limiter 28 is telescopic, however other embodiments may incorporate various retraction and expansion mechanisms know in the art. In yet another embodiment, the limiter 28 may be integrated into, or incorporate, the dampening device 26.

In operation, as depicted in FIGS. 7 and 8, the mirrored staggered orientation of the first v-shaped arm in conjunction with the second v-shaped arm, allow for articulation of the suspension system without binding. A further utility of the mirrored and staggered orientation is compact packaging with increased rigidity.

Figure 9:
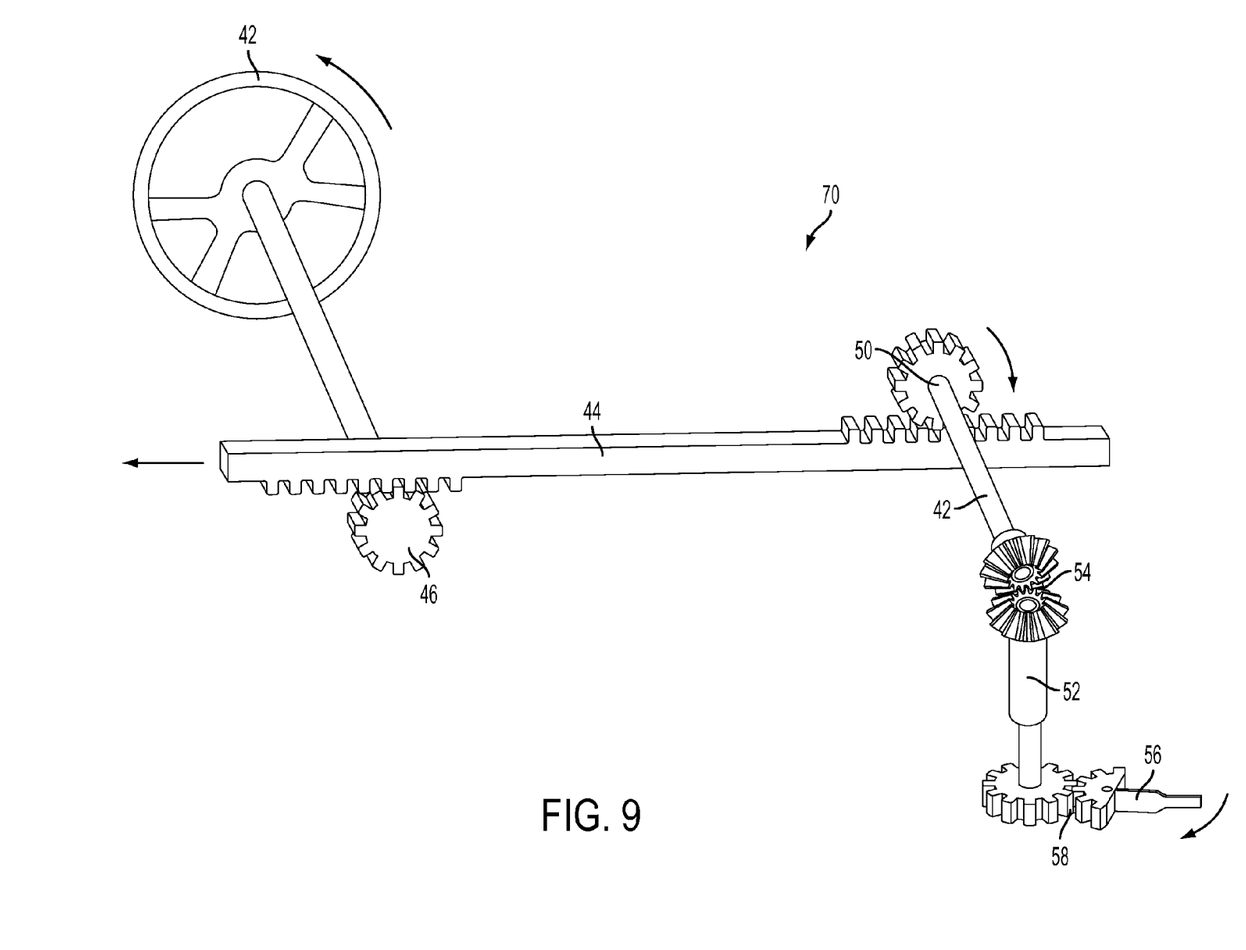
FIG. 9 depicts an exposed perspective view of a steering system in accordance with an embodiment of the present invention.

FIG. 9 depicts an exposed perspective view of a steering system 70 in accordance with an embodiment of the present invention. A steering wheel 42 is functionally attached to a medial end of a rack 44 by a rack gear arrangement 46. The rack 44 is functionally attached to a torque tube 48 at a distal end of the rack 44 by rack pinion arrangement 50. The torque tube 48 is further functionally attached to a superior end of a steering damper 52, by a damper gear arrangement 54, wherein the steering damper 52 is mounted in parallel to the compression and rebound plane of a suspension system. An inferior end of the steering damper 52 is functionally attached to a wheel spindle 56 by a spindle gear arrangement 58 for steering the wheel via the spindle 56.

Various embodiments of the invention are described above in the Detailed Description. While these descriptions directly describe the above embodiments, it is understood that those skilled in the art may conceive modifications and/or variations to the specific embodiments described herein. Any such modifications or variations that fall within the purview of this description are intended to be included therein as well. Unless specifically noted, it is the intention of the inventor(s) that the words and phrases in the specification and claims be given the ordinary and accustomed meanings to those of ordinary skill in the applicable art(s).

The foregoing description of various embodiments of the present invention known to the applicant at the time of filing this application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the present invention in various embodiments and with various modifications as are suited to the particular use contemplated. Therefore, it is intended that the present invention not be limited to the particular embodiments disclosed for carrying out the present invention.

While particular embodiments of the present invention have been shown and described, it will be obvious to those skilled in the art that, based upon the teachings herein, changes and modifications may be made without departing from the present invention and its broader aspects. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. An apparatus, comprising:
   a first articulating v-shaped arm comprising an upper v-arm having an inferior end and a superior end and a lower v-arm having an inferior end and a superior end;
   a second articulating v-shaped arm comprising an upper v-arm having an inferior end and a superior end and a lower v-arm having an inferior end and a superior end; and
   a wheel carrier attached to the first and second v-shaped arms,
   wherein the inferior end of the first upper v-arm is pivotally attached to the superior end of the first lower v-arm forming a first "v" shape, the inferior end of the second upper v-arm is pivotally attached to the superior end of the second lower v-arm forming a second "v" shape, and the inferior ends of the first and second lower v-arms are pivotally attached to the wheel carrier.

2. The apparatus according to claim 1, further comprising at least one removable dampener for controlling articulation of the first and second v-shaped arms.

3. The apparatus according to claim 2, wherein the at least one dampener is selected from the group comprising of a shock, spring, leaf spring, coil, torsion bar, cantilever spring, cantilever shock and combinations thereof 4. The apparatus according to claim 1, further comprising an adjustable vertical limiter affixed substantially perpendicular to the wheel carrier for regulating suspension travel.

5. The apparatus according to claim 1, further comprising at least one cross-brace connecting the first v-shaped arm to the second v-shaped arm for improved structural rigidity and support of the apparatus.

6. The apparatus according to claim 1, further comprising a vehicle pivotally attached to the superior ends of the first and second upper v-arm.

7. The apparatus according to claim 1, wherein the first and second v-shaped arms are configured in a plane substantially parallel to the vertical axis of the wheel carrier.

8. The apparatus according to claim 1, wherein the first v-shaped arm is substantially parallel to the second v-shaped arm.

9. The apparatus according to claim 1, wherein the first v-shaped arm is substantially perpendicular to the second v-shaped arm.

* * * * *

UNITED STATES PATENT AND TRADEMARK OFFICE
CERTIFICATE OF CORRECTION

PATENT NO. : 8,235,404 B2
APPLICATION NO. : 12/714197
DATED : August 7, 2012
INVENTOR(S) : Winthrop Dada Page 1 of 1

It is certified that error appears in the above-identified patent and that said Letters Patent is hereby corrected as shown below:

ON THE TITLE PAGE:

Item (73) "Assignee", please delete the Assignee information. There is no Assignee for this patent.

Signed and Sealed this
Nineteenth Day of March, 2013

Teresa Stanek Rea
*Acting Director of the United States Patent and Trademark Office*